Oct. 14, 1969         C. V. GARDNER         3,472,482
                      FUELING NOZZLE
Filed June 10, 1966                          2 Sheets-Sheet 2
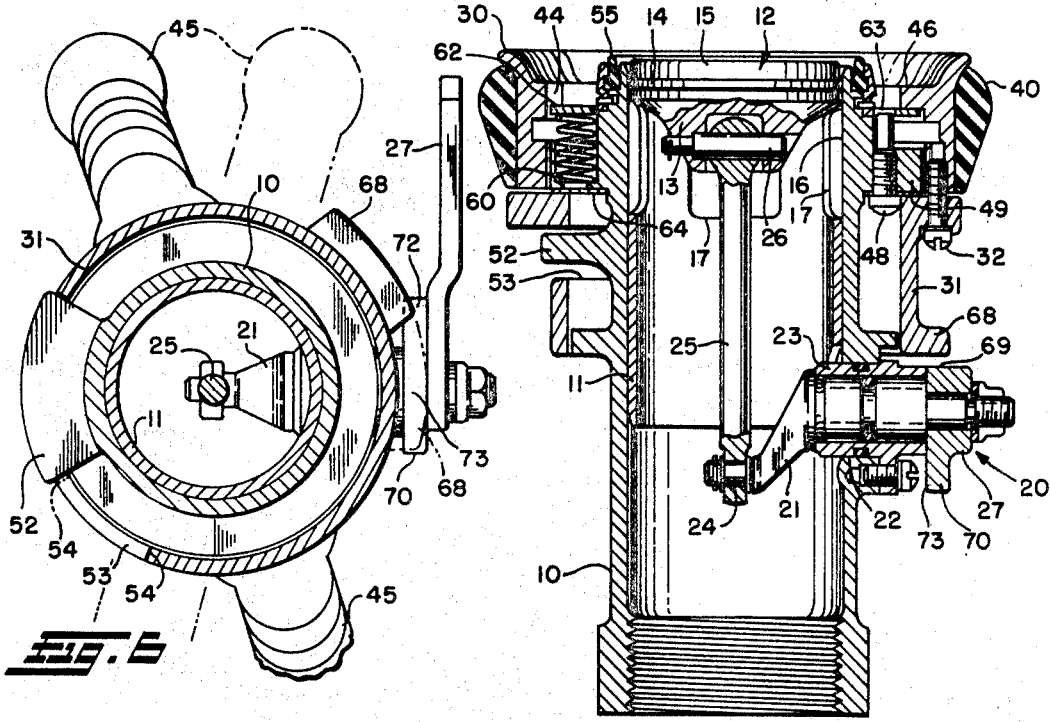
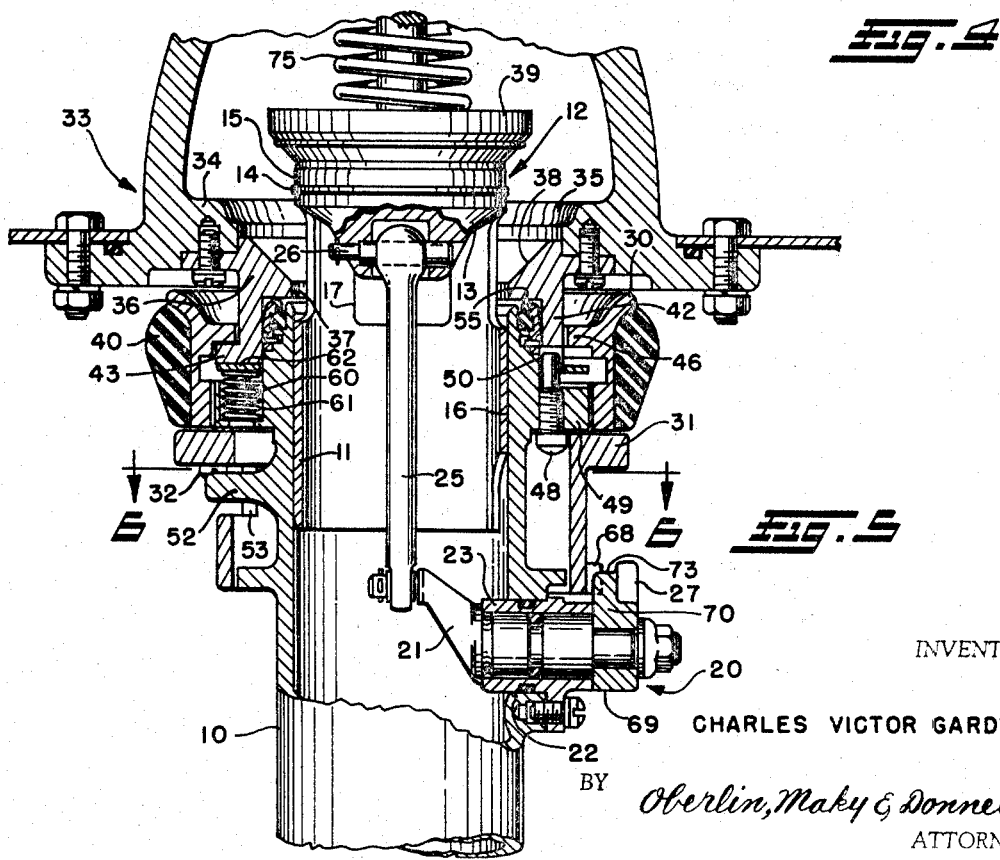
INVENTOR
CHARLES VICTOR GARDNER
BY
Oberlin, Maky & Donnelly
ATTORNEYS

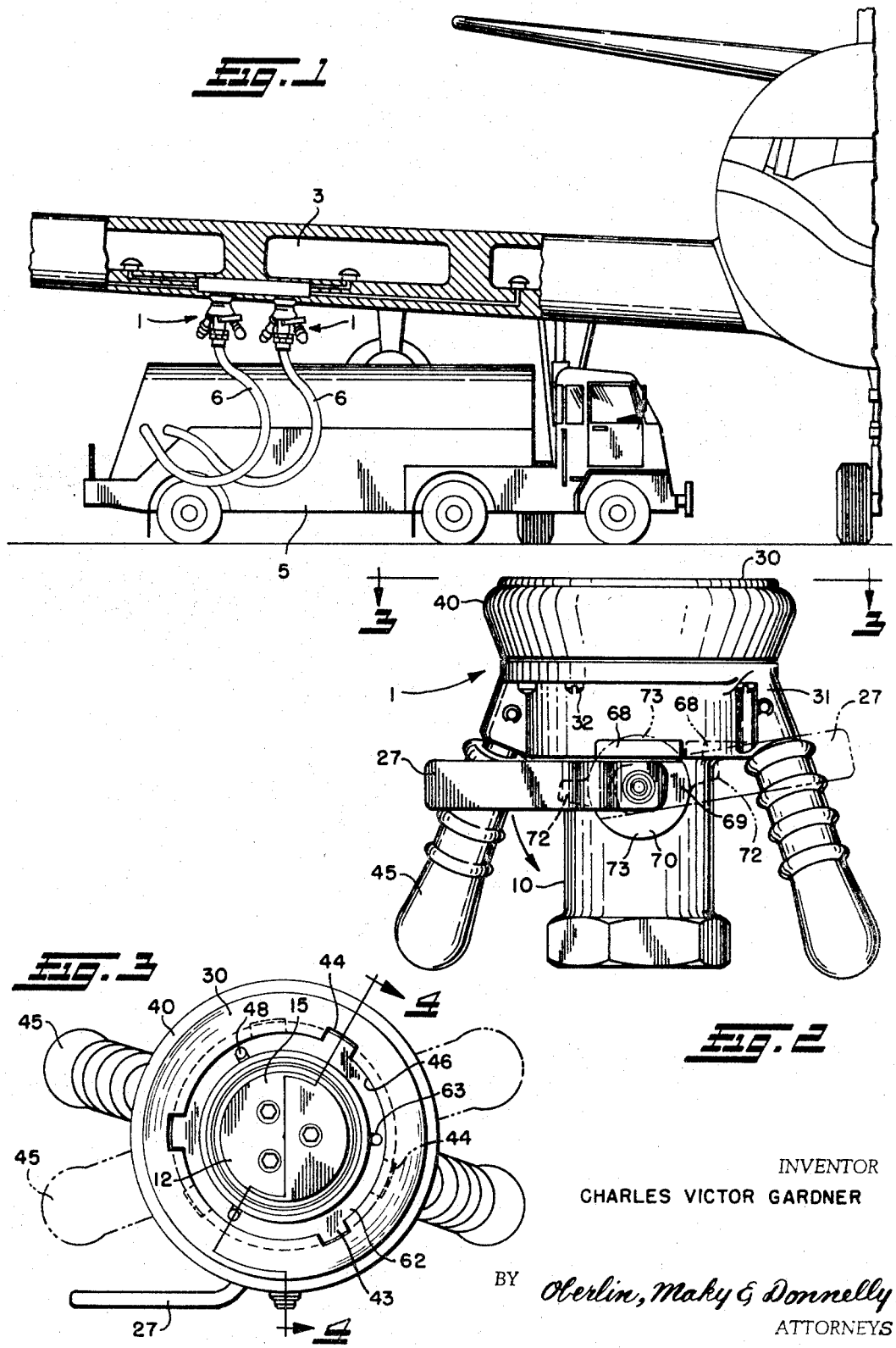

United States Patent Office 3,472,482
Patented Oct. 14, 1969

3,472,482
FUELING NOZZLE
Charles Victor Gardner, Malibu, Calif., assignor to Parker-Hannifin Corporation, Cleveland, Ohio, a corporation of Ohio
Filed June 10, 1966, Ser. No. 556,727
Int. Cl. F16k *35/00, 51/00*
U.S. Cl. 251—89.5          6 Claims

ABSTRACT OF THE DISCLOSURE

A nozzle in which the valve is axially slidable by actuation of a bell crank journaled in a tubular body, and having a sleeve telescopically received within the body and fixed to the valve for guiding the movement of the valve between open and closed positions.

---

The present invention relates generally, as indicated, to a fueling nozzle and more particularly to certain improvements in fueling nozzles especially of the type shown in the patent to Robert H. Davies, Patent No. 2,519,358, granted Aug. 22, 1950.

In such Davies patent, there is disclosed a fueling nozzle which is adapted to be connected to the intake housing of an aircraft wing tank or the like, and for that purpose the nozzle is provided with a quick connect, disconnect outer sleeve rotatably secured to an inner sleeve affixed to a fuel hose. Within the inner sleeve there is a valve which when opened unseats the tank valve to permit fuel under pressure to pass into the tank. However, means associated with the fueling nozzle precludes opening of the nozzle valve either accidentally or otherwise except when the nozzle is properly locked in sealed engagement with the tank intake housing, and further means are provided for preventing detachment of the nozzle until the nozzle valve and tank valve actuated thereby are completely closed, whereby accidental fuel leakage is substantially eliminated.

Although the fueling nozzle of the Davies patent operates quite satisfactorily, there is a need for a less expensive and more simple fueling nozzle capable of performing the same functions and having similar safety features, which is a principal object of the present invention.

Another object is to provide such a fueling nozzle with a novel valve actuating mechanism for opening and closing the nozzle valve, as well as novel means for locking the nozzle valve in the open position.

Still another object is to provide such a fueling nozzle with an elongated inner sleeve integral with the nozzle valve for guiding the movement thereof between the open and closed positions.

A further object is to provide a fueling nozzle of the type indicated with novel means for detachably mounting the nozzle in sealed engagement with the intake housing of a tank to be filled.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is an elevation view on a reduced scale of a preferred embodiment of fueling nozzle in accordance with this invention shown connected to the fuel tank of an aircraft or the like for supplying fuel thereto from a tank truck of conventional type;

FIG. 2 is an enlarged elevation view of the fueling nozzle of FIG. 1;

FIG. 3 is a top plan view of the nozzle of FIG. 2 as seen from the plane of the line 3—3 thereof;

FIG. 4 is an enlarged vertical section through the nozzle of FIG. 3 taken on the plane of the line 4—4 showing the nozzle valve in the closed position;

FIG. 5 is a vertical section similar to FIG. 4, but with the nozzle shown locked in fluid tight engagement with the inlet housing of a fuel tank and the nozzle valve and tank valve in the open positions; and FIG. 6 is a horizontal section through the fueling nozzle of FIG. 5 taken on the plane of the line 6—6 thereof.

Referring now in detail to the drawing, and first of all to FIG. 1, a pair of fueling nozzles 1 in accordance with this invention are shown connected to the inlet housing of an aircraft wing tank 3 for supplying fuel to the wing tank from a tank truck 5 or the like through suitable fuel hoses 6. However, it should be understood that the fueling nozzles 1 may be used for defueling as well as refueling, and not only of aircraft tanks, but tank trucks, diesel locomotives, storage tanks, and hydrant filled vehicles, to name a few.

As clearly shown in FIGS. 2–6, the fueling nozzle 1 generally consists of a tubular body 10 internally threaded at one end for connection to a fuel hose 6 and having an inner sleeve 11 and nozzle valve 12 slidable therein. The inner sleeve 11 may be made integral with the nozzle valve 12 as by casting the lower valve portion 13 and inner sleeve 11 in one piece out of aluminum or like metal for guiding the nozzle valve 12 during raising and lowering of the same between the closed and open positions of FIGS. 4 and 5, respectively. A Teflon or like seal 14 clamped between the upper portion 15 of the nozzle valve 12 and the lower portion 13 engages the inner wall 16 of the tubular body 10 when the nozzle valve 12 is in the retracted position to form a positive leaktight joint precluding the leakage of fuel therepast. However, when the nozzle valve 12 is extended outwardly beyond the tubular body 10 as in FIG. 5, fuel is permitted to pass freely through openings 17 in the inner sleeve 11 and around the nozzle valve 12.

For opening and closing of the nozzle valve 12, there is provided a valve actuating mechanism 20 comprising a bell crank 21 journaled in a transverse bore 22 in the side of the tubular body 10 as by means of a sleeve bearing 23 attached to the tubular body 10. The inner end of the bell crank 21 extends through an aperture 24 in a connecting rod 25 pivotally connected to the nozzle valve 12 by a pin 26, while the outer end of such bell crank 21 has an operating lever 27 mounted thereon which when rotated between the solid and phantom line positions of FIG. 2 causes raising and lowering of the nozzle valve 12 as aforesaid.

A connector 30 having a shell 31 attached thereto by screws 32 is rotatably mounted on the valve end of the fueling nozzle 1 for releasably attaching the nozzle to a tank inlet housing 33 which is of the type illustrated in the aforementioned Davies Patent No. 2,519,358, including an inwardly projecting portion 34 having an opening 35 therethrough and an annular member 36 attached to the inwardly projecting portion 34 with a passage 37 therethrough and a conical seat 38 surrounding the passage 37 normally engaged by a tank valve 39. A sleeve 42 having outwardly projecting lugs 43 depends from the annular member 36 for receipt in correspondingly spaced slots 44 in the connector 30. Although the number and spacing of the lugs 43 and slots 44 may obviously be varied as desired, in the form shown there are three such lugs and slots spaced 120° apart. A scuff ring 40 may be disposed around the connector 30.

To attach the fueling nozzle 1 to the inlet housing 33, the nozzle is grasped by a pair of handle grips 45 projecting from the shell 31 and lifted into engagement with the inlet housing 33 with the slots 44 in the connector 30 in alignment with the lugs 43 for receipt of the lugs 43 therein, after which the handle grips 45 and thus the connector 30 are rotated in a counterclockwise direction to the phantom line position of FIG. 3 for locating the lugs 43 underneath the inwardly projecting ledge 46 of the connector 30. During such rotation of the connector 30, the tubular body 10 with fuel hose 6 attached thereto is held stationary by a plurality of pins 48 which project through a flange 49 in the tubular body 10 into correspondingly spaced recesses 50 in the bottom of the inlet housing sleeve 42. For accurately locating the pins 48 in alignment with the recesses 50 in the sleeve 42 when the sleeve lugs 43 are in alignment with the connector slots 44, there is a stop 52 which projects from the tubular body 10 through a slot 53 in the shell 31. When the shell 31 and connector 30 are in the phantom line position illustrated in FIG. 6 with the end 54 of the slot 53 engaging the stop 52, such alignment will be assured. Now, as the handle grips 45 are rotated with the lugs 43 extending through the connector slots 44 and the tubular body 10 keyed to the sleeve 42 by the pins 48 to the solid line position of FIG. 6 with the stop 52 contacting the other end of the slot 53, the lugs 43 are forced under the connector ledge 46 as shown in FIGS. 3 and 5 to force a seal 55 carried by the upper end of the tubular body 10 endwise into fluid tight engagement with the inlet housing member 36. For that purpose, the lugs 43 may be tapered if desired to cam the connector 30 and thus the tubular body 10 with seal 55 toward the inlet housing 33, as in the aforementioned Davies patent.

Compression springs 60 located in recesses 61 in the flange 49 of the tubular body 10 between the pins 48 urge a ring 62 against the bottom of the lugs 43 to assist in detaching the fueling nozzle 1 from the inlet housing 33 upon turning of the connector 30 in the reverse direction to bring the connector slots 44 back into alignment with the lugs 43. Openings 63 are provided in the ring 62 through which the pins 48 extend. Moreover, a split ring 64 may be disposed between the body flange 49 adjacent the surface of the shell 31 to facilitate rotational movement therebetween.

Premature opening of the nozzle valve 12 prior to securely locking the same to the inlet housing 33 is precluded by a projection 68 on the lower end of the shell 31 which overlies a flat 69 on a stop 70 formed integral with the operating lever 27 when the operating lever 27 is in the nozzle valve closing position and the connector 30 is out of the fully locked position to prevent turning of the operating lever 27 to the nozzle valve opening position. Only when the connector 30 is turned as far as possible in the locking direction will the projection 68 be clear of the stop to permit the operating lever 27 to be swung in a counterclockwise direction from the solid line position to the phantom line position of FIG. 2 for opening the nozzle valve 12.

During swinging of the operating lever 27 in such counterclockwise direction with the connector 30 in the locked position, the inner end of the bell crank 21 is moved over top center to bring the stop extension 72 into engagement with the projection 68 for maintaining the nozzle valve 12 in the open position. At the same time, the semi-cylindrical portion 73 on the stop 70 which is directly opposite the flat 69 is swung into the path of the shell projection 68 as illustrated in phantom lines in FIG. 2, whereby the connector 30 cannot be rotated to disengage the fueling nozzle 1 until the lever 27 is returned to the nozzle valve closing position with the semi-cylindrical portion 73 out of the way.

As the nozzle valve 12 is moved to the open position as aforesaid, it engages the tank valve 39 to move the same away from its seat 38 and thereby permit flow of fuel therepast for refueling or defueling of the tank 3 as desired. Then, when the nozzle valve 12 is closed, a return spring 75 or the like causes the tank valve 39 to be seated once again against its conical seat 38 to preclude flow to and from the tank 3.

From the above discussion, it can now be seen that the fueling nozzle of the present invention is of a unique and simple construction which permits opening of the nozzle valve only when the nozzle is properly engaged with an inlet housing of a fuel tank or the like, and precludes disengagement of the nozzle until the valve is fully closed. Moreover, there is a sleeve affixed to the nozzle valve for guiding the movement thereof between the open and closed positions and a unique valve actuating mechanism for effecting such nozzle valve movements.

Other modes of applying the principles of the invention may be employed, change being made as regards the details described, provided the features stated in any of the following claims or the equivalent of such be employed.

I, therefore, particularly point out and distinctly claim as my invention:

1. A nozzle comprising a tubular body having a valve slidable therein, means for moving said valve axially with respect to said body between an open position permitting fluid to flow through said body and a closed position blocking such fluid flow, a sleeve telescopically received within said body and fixed to said valve for guiding the movements of said valve between such open and closed positions, a connector means mounted on said body for rotational movement between a first position whereat said nozzle is adapted to be locked in fluid-tight engagement with the inlet housing of a tank and a second position unlocking said nozzle, and means for precluding opening of said valve except when said connector means is in such first locked position, said means for moving said valve between such open and closed positions including a bell crank means operatively connected to said valve for effecting such movements of said valve upon rotation of said bell crank means, and said means for precluding opening of said valve except when said connector means is in such first locked position comprising a stop carried by said bell crank means having a flat thereon, and a projection carried by said connector means which overlies said flat when said valve is in the closed position and said connector is out of the locked position to preclude rotation of said bell crank means, said stop being further provided with a semi-cylindrical portion opposite said flat which is in the path of said projection when said connector means is in the locked position and said valve is open to preclude rotation of said connector to the unlocked position, and an extension which engages said projection for locking said bell crank means over center when said connector means is in the locked position and said valve is in the open position.

2. A nozzle comprising a tubular body having a valve slidable therein, means for moving said valve axially with respect to said body between an open position permitting fluid to flow through said body and a closed position blocking such fluid flow, a sleeve telescopically received within said body and fixed to said valve for guiding the movements of said valve between such open and closed positions, a connector means mounted on said body for rotational movement between a first position whereat said nozzle is adapted to be locked in fluid-tight engagement with the inlet housing of a tank and a second position unlocking said nozzle, means for precluding opening of said valve except when said connector means is in such first locked position, and a shell attached to said connector means for movement therewith, said shell having a slot therein, and a stop projecting from said body through said slot for limiting the rotational movement of said connector means between such locked and unlocked positions.

3. A nozzle comprising a tubular body having a valve slidable therein, means for moving said valve axially with respect to said body between an open position permitting fluid to flow through said body and a closed position blocking such fluid flow, a connector means mounted on said body for rotational movement between a first position whereat said nozzle is adapted to be locked in fluid-tight engagement with the inlet housing of a tank and a second position unlocking said nozzle, and means for precluding opening of said valve except when said connector means is in such first locked position, said means for moving said valve between such open and closed positions including a lever means operatively connected to said valve for effecting such movements thereof, and said means for precluding opening of said valve except when said connector means is in such first locked position comprising a stop carried by said lever means having a flat thereon, and a projection carried by said connector means which overlies said flat when said valve is in the closed position and said connector is out of the locked position to preclude movement of said lever means, said stop being further provided with an extension which engages said projection for locking said lever means over center when said connector means is in the locked position and said valve is in the open position.

4. A nozzle comprising a tubular body having a valve slidable therein, means for moving said valve axially with respect to said body between an open position permitting fluid to flow through said body and a closed position blocking such fluid flow, a connector means mounted on said body for rotational movement between a first position whereat said nozzle is adapted to be locked in fluid-tight engagement with the inlet housing of a tank and a second position unlocking said nozzle, and a shell attached to said connector means for movement therewith, said shell having a slot therein, and a stop projecting from said body through said slot for limiting the rotational movement of said connector means between such locked and unlocked positions.

5. The nozzle of claim 4 further comprising a sleeve telescopically received within said body and fixed to said valve for guiding the movements of said valve between such opened and closed positions, said valve and sleeve being of a one-piece construction with apertures in said sleeve adjacent said valve to permit flow therethrough when said valve is in such open position.

6. The nozzle of claim 5 wherein said means for moving said valve axially with respect to said body as aforesaid comprises a bell crank journaled in said tubular body, a connecting rod having opposite ends pivotally connected to said valve and said bell crank, and means for rotating said bell crank.

References Cited
UNITED STATES PATENTS

| | | | |
|---|---|---|---|
| 1,583,427 | 5/1926 | Snow | 251—279 X |
| 2,519,358 | 8/1950 | Davies | 251—89.5 |
| 2,598,009 | 5/1952 | Peeps | 251—149.5 |
| 2,680,030 | 6/1954 | Hoelzer | 251—89.5 |
| 2,716,999 | 9/1955 | Badger et al. | 137—614.06 X |
| 2,890,718 | 6/1959 | Smith | 251—149.4 X |
| 3,143,137 | 8/1964 | Muller | 251—89.5 X |
| 3,216,744 | 11/1965 | Elbogen et al. | 251—89.5 X |
| 3,251,379 | 5/1966 | Lebow | 251—89.5 X |

HENRY T. KLINKSIEK, Primary Examiner

U.S. Cl. X.R.

251—149.5